(12) United States Patent
Sivaswamy et al.

(10) Patent No.: US 12,244,908 B2
(45) Date of Patent: Mar. 4, 2025

(54) REAL TIME FEATURE ANALYSIS AND INGESTING CORRELATED ADVERTISEMENTS IN A VIDEO ADVERTISEMENT

(71) Applicant: INTERNATIONAL BUSINESS MACHINES CORPORATION, Armonk, NY (US)

(72) Inventors: Hemant Kumar Sivaswamy, Pune (IN); Venkata Vara Prasad Karri, Visakhapatnam (IN); Girish Padmanabhan, Pune (IN); Kamal Kiran Trood Yamala, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 17/475,554

(22) Filed: Sep. 15, 2021

(65) Prior Publication Data

US 2023/0077795 A1    Mar. 16, 2023

(51) Int. Cl.
*H04N 21/81*    (2011.01)
*G06Q 30/0241*   (2023.01)
(Continued)

(52) U.S. Cl.
CPC ....... *H04N 21/812* (2013.01); *G06Q 30/0255* (2013.01); *G06Q 30/0277* (2013.01);
(Continued)

(58) Field of Classification Search
CPC ........... H04N 21/812; H04N 21/44008; H04N 21/44016; H04N 21/47217;
(Continued)

(56) References Cited

U.S. PATENT DOCUMENTS 8,533,755 B1* 9/2013 Sherwin ........... H04N 21/23424
725/35
8,750,602 B2* 6/2014 Li ....................... G06F 18/2431
382/224
(Continued)

FOREIGN PATENT DOCUMENTS

KR    10-1762408 B1    7/2017

OTHER PUBLICATIONS

"A Method of Providing Interactive Advertising Embedded in Paused Video Using Cognitive Way," IPCOM00256467D, Dec. 3, 20218, 6 pages.
(Continued)

*Primary Examiner* — Nathan J Flynn
*Assistant Examiner* — Christine A Kurien
(74) *Attorney, Agent, or Firm* — Joseph P. Curcuru (57) ABSTRACT

A computer-implemented method for displaying advertisements. The method includes associating feature metadata with a product video advertisement of a product. The method includes identifying, based on the feature metadata, a feature of the product corresponding with a section of the product video advertisement when a triggering event is detected during playing of the product video advertisement. The method includes displaying a second product video advertisement of a second product that includes the feature of the product.

20 Claims, 7 Drawing Sheets

(51) Int. Cl.
    *G06Q 30/0251*     (2023.01)
    *G06Q 30/0282*     (2023.01)
    *G06Q 50/00*     (2012.01)
    *H04N 21/44*     (2011.01)
    *H04N 21/472*     (2011.01)
    *H04N 21/4788*     (2011.01)

(52) U.S. Cl.
    CPC ......... *G06Q 30/0282* (2013.01); *G06Q 50/01* (2013.01); *H04N 21/44008* (2013.01); *H04N 21/44016* (2013.01); *H04N 21/47217* (2013.01); *H04N 21/4788* (2013.01)

(58) Field of Classification Search
    CPC ........... H04N 21/4788; G06Q 30/0255; G06Q 30/0277; G06Q 30/0282; G06Q 50/01
    See application file for complete search history.

(56) References Cited

U.S. PATENT DOCUMENTS

| | | | | |
|---|---|---|---|---|
| 9,465,435 | B1* | 10/2016 | Zhang | H04N 21/8549 |
| 10,154,319 | B1* | 12/2018 | Ramakrishnan | H04N 21/23106 |
| 10,327,026 | B1* | 6/2019 | Mishra | H04N 21/2668 |
| 10,779,037 | B2* | 9/2020 | Li | H04N 21/8547 |
| 11,457,259 | B2* | 9/2022 | Ansari | H04N 21/43615 |
| 2008/0295129 | A1* | 11/2008 | Laut | H04N 21/812 725/34 |
| 2010/0031162 | A1* | 2/2010 | Wiser | H04N 21/431 715/747 |
| 2011/0066497 | A1* | 3/2011 | Gopinath | G06Q 30/02 705/14.53 |
| 2011/0321082 | A1* | 12/2011 | Weerasinghe | H04N 5/445 725/139 |
| 2013/0347032 | A1* | 12/2013 | Geraci | H04N 21/47815 725/34 |
| 2014/0304724 | A1 | 10/2014 | Shin | |
| 2015/0026720 | A1* | 1/2015 | Rakshit | H04N 21/252 725/35 |
| 2016/0110884 | A1* | 4/2016 | Fuzell-Casey | G06F 16/7837 382/103 |
| 2016/0156946 | A1* | 6/2016 | Shi | H04N 21/4888 725/32 |
| 2017/0188105 | A1* | 6/2017 | Witenstein-Weaver | G06V 30/148 |
| 2018/0324493 | A1* | 11/2018 | Narasimhan | H04N 21/8456 |
| 2019/0005542 | A1* | 1/2019 | Goldshtein | G06Q 30/0256 |
| 2019/0147496 | A1 | 5/2019 | Faraguna | |

OTHER PUBLICATIONS

"Presenting Options for Communication with a Connection Having Product Experience," IPcom000259757D, Sep. 16, 2019. 4 pages.
"System to locate product or services of interest within a video or multiple media set and enable extraction of additional information to assist with purchase of the product.", An IP.com Prior Art Database Technical Disclosure, IP. com No. IPCOM000247788D, IP.com Electronic Publication Date: Oct. 6, 2016, 6 pps.

* cited by examiner

REAL TIME FEATURE ANALYSIS AND INGESTING CORRELATED ADVERTISEMENTS IN A VIDEO ADVERTISEMENT

BACKGROUND

Today there are many forms of product advertisements (ads). Typically, a brand will market products using television commercials, print ads, and through online ads. For instance, marketers will often create product videos describing features of the products. Additionally, consumers, online influencers, and/or other websites (e.g., tech websites) may create their own product review videos.

SUMMARY

In an embodiment, a computer-implemented method for displaying advertisements is disclosed. The method includes associating feature metadata with a product video advertisement of a product. The method includes detecting a triggering event during playing of the product video advertisement. The method includes identifying a feature of the product corresponding with a section of the product video advertisement when the triggering event occurred based on the feature metadata. The method includes displaying a second product video advertisement of a second product that includes the feature of the product.

Other embodiments including a system and computer program product are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented.

DETAILED DESCRIPTION

In many situations, when consumers are considering the purchase of a product, they go online to learn more about the products by reading reviews and watching product reviews or advertisement videos. Product advertisements or videos may also appear while a user/consumer is browsing online such as, but not limited to, on social media sites (e.g., Facebook®, Twitter®, etc.), a shopping site, a video site (e.g., YouTube®), and a news or sports site. Often times, when there are similar products, the consumer is interested in learning which of the similar products provide the best features that are of interest to the consumer. Thus, it would be beneficial to provide consumers with related ads of products having the features of interest to a consumer during a product video advertisement.

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to." Unless otherwise indicated, as used throughout this document, "or" does not require mutual exclusivity, and the singular forms "a", "an" and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions or computer executable instructions configured to perform a specific task. For example, a module may comprise of software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

Figure 1:
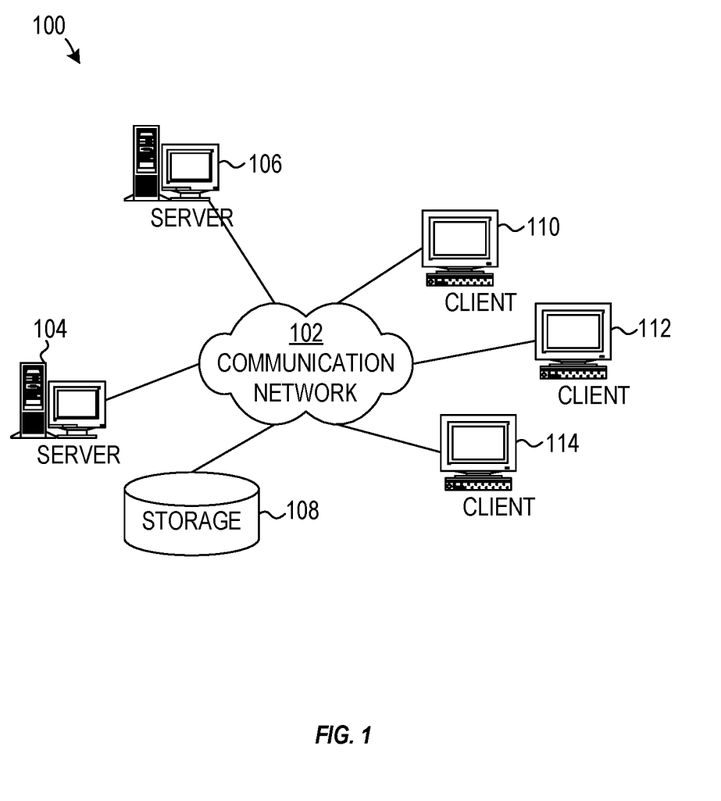
FIG. 1 is a diagram illustrating a network in accordance with an embodiment of the present disclosure.

FIG. 1 is a diagram illustrating a network 100 in accordance with an embodiment of the present disclosure. The network 100 includes a communication network 102 that enables communications between various network devices such as, but not limited to, server 104, server 106, client 110, client 112, client 114, and storage unit 108. The network 100 may include additional servers, clients, and other devices not shown.

The communication network 102 can include various types of private networks and/or public networks such as, but not limited to, home networks, local-area networks (LANs), wide-area networks (WANs), and metropolitan-area networks (MANs), cellular networks, service provider networks, and the Internet. The communication network 102 provides communications links between the network devices. The communication links may include both wired and wireless links. The communication links may include a direct link or may comprise of multiple links passing through one or more network devices such as, but not limited to, routers, firewalls, servers, and switches.

In the depicted embodiment, clients 110, 112, and 114 may be, but are not limited to, personal computers, mobile devices, or other connected devices of consumers. The server 104, server 106, and/or the storage unit 108 may provide data or other services to the clients 110, 112, and 114. As an example, in an embodiment, the client 110 can communicate with the server 104 to request the streaming of a product review video, technical product description video, and/or a video advertisement of a particular product (collectively referred to herein as a product video advertisement). The server 104 may communicate with the storage 108 to retrieve the product video advertisement or other related product video advertisements as described herein. The server 104 streams the requested product video advertisement to the client 110.

As will be described herein, in an embodiment, a product video advertisement is associated with feature metadata that identifies the particular feature and range within the product video advertisement that the particular feature of the product is discussed. For example, the feature metadata may identify a first feature of the product as being discussed between 5-minute mark to the 10-minute mark of the product video advertisement, a second feature of the product as being discussed between 10-minute mark to the 13-minute mark of the product video advertisement, and so on. The feature metadata is used to provide the user or consumer with other products having similar features when a triggering event occurs. As a nonlimiting example, a triggering event may occur when a user rewinds a product video advertisement to rewatch a particular section of the video pertaining to a certain feature of the product. This enables the user to quickly review other products having the same or similar features of interest to the user.

Figure 2:
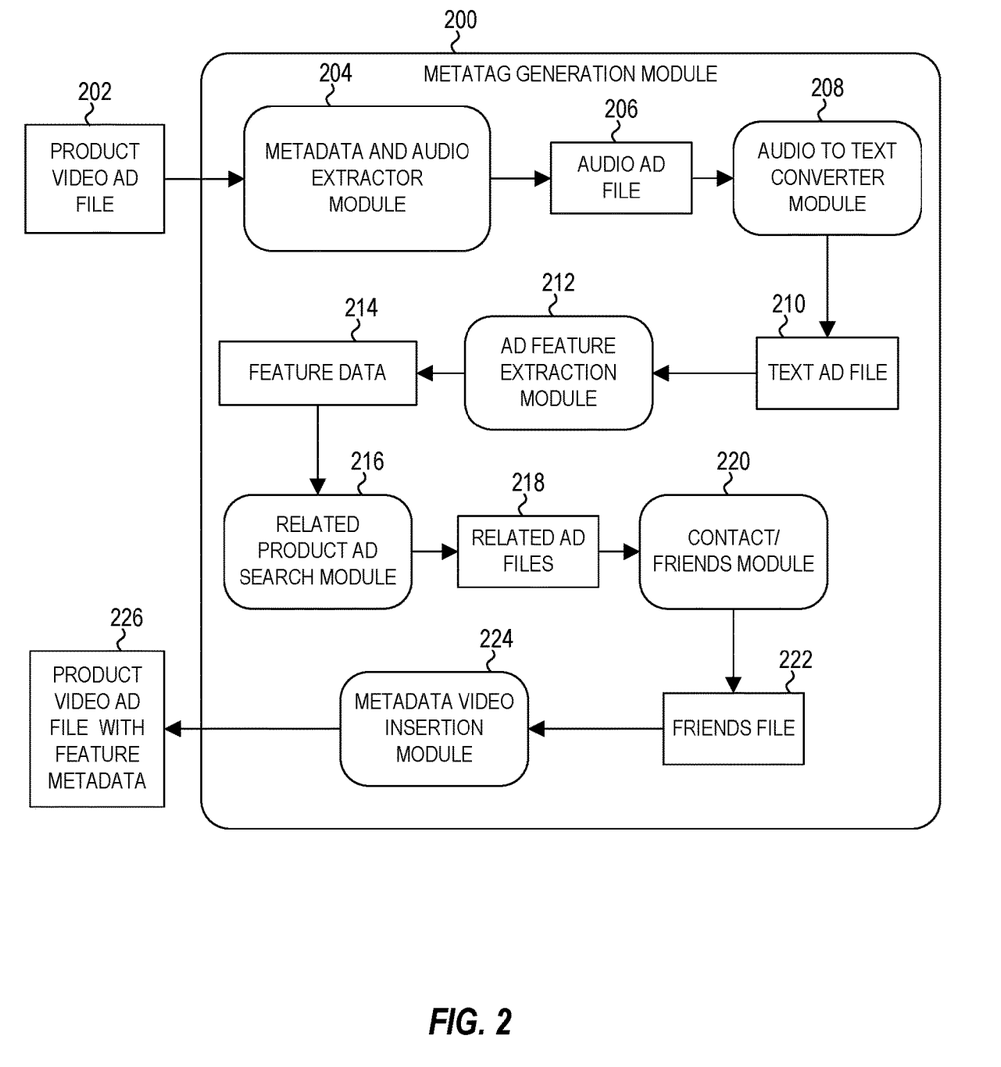
FIG. 2 is a diagram illustrating a metadata generation module for associating feature metadata to a video file in accordance with an embodiment of the present disclosure.

FIG. 2 is a diagram illustrating a metadata generation module 200 for associating feature metadata to a video file in accordance with an embodiment of the present disclosure. The metadata generation module 200 can be implemented on and executed by a server such as server 104 in FIG. 1. Alternatively, the metadata generation module 200 can be implemented on and executed by another computing device and then uploaded to a server such as the server 104. In the depicted embodiment, the metadata generation module 200 receives a product video advertisement (ad) file 202. The product video advertisement file 202 may be a video that advertises or reviews any type of product. The product video advertisement file 202 may have been created by a marketing team of a manufacturer/producer of the product or may have been created by a third-party reviewer. The product video advertisement file 202 is passed to a metadata and audio extractor module 204.

The metadata and audio extractor module 204 extracts metadata information from the product video advertisement file 202. Metadata is data about the product video advertisement file 202. The metadata information of the product video advertisement file 202 may include the video file name, date created, date uploaded, who created the file, file length, product name or type described in video file, or any other type of related file information.

The metadata and audio extractor module 204 also extracts the audio portion of the product video advertisement file 202 to generate an audio advertisement file 206. The audio advertisement file 206 is passed to an audio to text converter module 208 that converts the audio in the audio advertisement file 206 to text to generate a text advertisement file 210. The text advertisement file 210 is passed to an advertisement feature extraction module 212.

The advertisement feature extraction module 212 parses the text advertisement file 210 and performs a feature search to determine the features of the product being advertised. As a nonlimiting example, the advertisement feature extraction module 212 may perform a keyword search for particular features of the product. For example, if the product being advertised is a laptop computer, the advertisement feature extraction module 212 may search for terms such as display, battery, memory or random-access memory (RAM), hard drive, processor, etc. Based on when these terms appear (e.g., the term display or display-related terms such as clear, pixels, crisp, bright, etc.) in the text advertisement file 210, the advertisement feature extraction module 212 can identify the range or portion of the product video advertisement that a particular feature of a product is discussed. In some embodiments, when the product in the product video advertisement file 202 is known, to improve efficiency, only a certain set of feature terms related to the known product is used in performing the feature search. In some embodiments, the type of product being advertised may be determined based on the extracted metadata from the product video advertisement file 202. Alternatively, in some embodiments, the type of product being advertised may be determined based on an image analysis of one or more images from the video ad file. Still, in some embodiments, the type of product being advertised may be given or manually selected by a user (e.g., a person responsible for processing the product video advertisements may know the type of product being advertised). In some embodiments, when the type of product being advertised is not known or undetermined, the advertisement feature extraction module 212 may be configured to search for all known feature terms. Based on the frequency and the particular set of feature keywords found, the advertisement feature extraction module 212 may infer a product being advertised. For example, if the terms phone, memory, processor, display, battery, weight, camera are key terms found, then the advertisement feature extraction module 212 may determine that the product being advertised is a mobile smartphone.

The advertisement feature extraction module 212 creates feature data 214 for features of the product. In an embodiment, the feature data 214 identify one or more features being advertised and the portion or range of the product video advertisement discussing the particular feature(s). For example, the feature data 214 may be a list or table indicating the feature(s) and corresponding range of the product video advertisement. Alternatively, the feature data 214 may be a plurality of feature metatags (e.g., feature1 metatag, feature2 metatag, etc.) that are used to tag the corresponding range of the product video advertisement. The feature data 214 may also identify or label non-feature portions of the video advertisement (e.g., from 0:00-2:33 is an introductory portion). The feature data 214 are passed to a related product advertisement search module 216.

The related product advertisement search module 216 searches for product video advertisements of products that have the same or similar feature(s) as the product in the product video advertisement. For example, for the bass feature of a speaker, the related product advertisement search module 216 searches for product video advertisements of products where the bass feature is present. The related product may or may not be the same type of product as that advertised in the product video advertisement file 202. For example, if the product in the product video advertisement file 202 is for a television where the bass feature of the speakers of the television is discussed, the related product may be another television brand/model, standalone speakers or soundbars, headphones, or even a mobile phone that has speakers with good bass.

In an embodiment, the related product advertisement search module 216 may rank the found related products based on reviews or other rankings of the related product as a whole and/or reviews/rankings of the particular feature or features of the related product associated with the feature data 214. In some embodiments the related product advertisement search module 216 may group the product video advertisements of the related products based on price or value (e.g., luxury/high-end, average price, best value, etc.). The related product advertisement search module 216 generates related advertisement files 218 that identifies the product video advertisements featuring the found related products corresponding to each of the features specified in the feature data 214.

In an embodiment, if a user/consumer has granted access permission to a user's contact list or social media sites, and the user's friends (e.g., Facebook® friends, Instagram® and/or Twitter® followers, LinkedIn® connections, etc.) or contacts (e.g., email contact and/or locally stored contacts list) have also granted access permission (collectively referred to as friends), the related advertisement files 218 may be passed to a contacts/friends module 220 to identify any friends that have purchased or left a review of a related product in the related advertisement files 218. The contacts/friends module 220 may generate a friends file 222 that maps the names or images of friends with the related products. The information on the friends file 222, the feature data 214, and the related advertisement files 218 are passed to a metadata video insertion module 224 that inserts or associates the information with the product video advertisement file 202 to generate a product video advertisement file with feature metadata 226.

It should be noted that although FIG. 2 depicts a process for generating/inserting feature metadata by analyzing an existing product video advertisement file, in other embodiments, feature metadata may be inserted or associated with a product advertisement file during the creation process of the product advertisement file.

Figure 3:
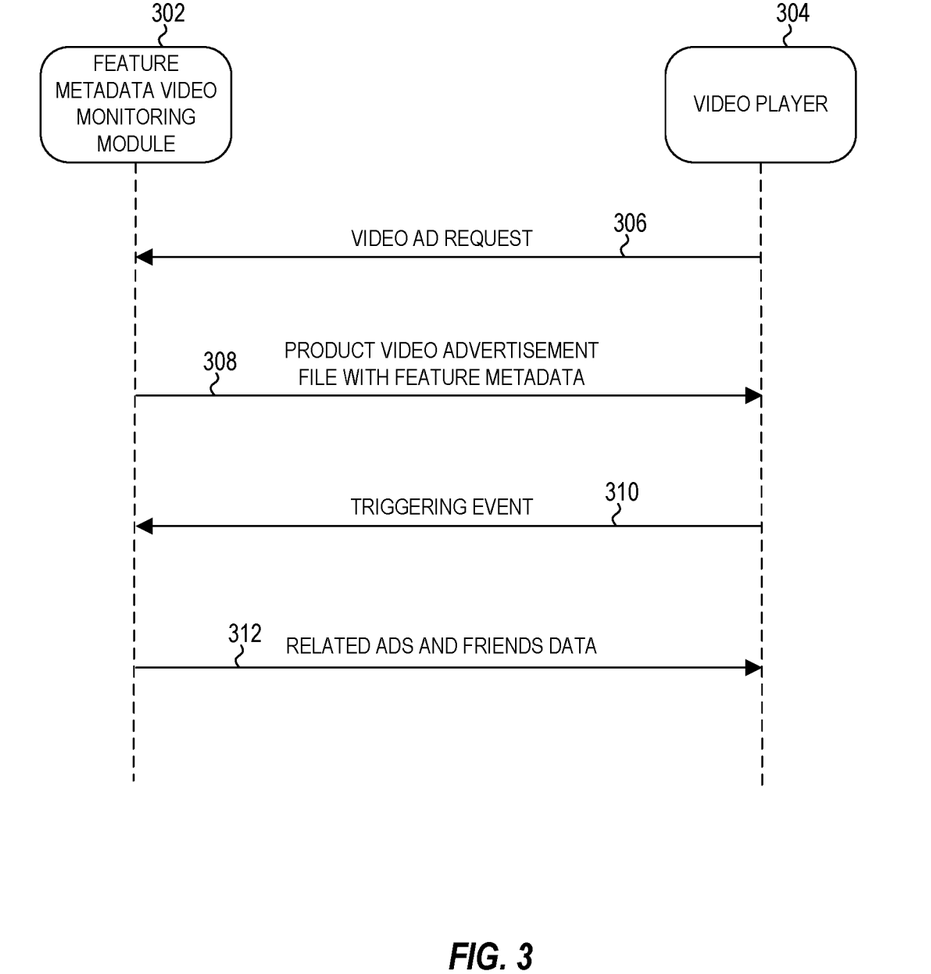
FIG. 3 is a diagram illustrating a sequence between a feature metadata video monitoring module and a video player in accordance with an embodiment of the present disclosure.

FIG. 3 is a diagram illustrating a sequence between a feature metadata video monitoring module 302 and a video player 304 in accordance with an embodiment of the present disclosure. As described below, the feature metadata video monitoring module 302 is configured to monitor for a user request to view a product video advertisement, play or stream the product video advertisement having the feature metatag data associated with it (e.g., created by the metadata generation module 200), and monitors for the triggering event to display the related product video advertisements. The feature metadata video monitoring module 302 may be implemented on and executed by a server that provides video streaming services (e.g., server 104 in FIG. 1). The video player 304 is software that may be located on a user device (e.g., client 110 in FIG. 1). The video player 304 may be a standalone video player application or may be integrated with a web browser or other applications. In some embodiments, the feature metadata video monitoring module 302 may also be on a user device (e.g., built into the video player 304 and/or an add-on module of a web browser). This enables the disclosed embodiments to function when the product advertisement file is downloaded to the user device instead of streaming from the server.

As shown in FIG. 3, the feature metadata video monitoring module 302 receives a video ad request 306 from the video player 304 to play or stream a product video advertisement of a product. The feature metadata video monitoring module 302 initiates playing or streaming of the product video advertisement file with feature metadata 308 on the video player 304. The feature metadata video monitoring module 302 monitors for a triggering event 310 from the video player 304. In an embodiment, a triggering event 310 can include, but are not limited to, a user pausing, rewinding, or forwarding the product video advertisement to a particular section of the product video advertisement. When the feature metadata video monitoring module 302 receives the triggering event 310 from the video player 304, the feature metadata video monitoring module 302 sends the related ads and friends data 312 to the video player 304. The related ads and friends data 312 contains the information of the product video advertisements of products having the same or similar feature(s) of the product in the original product video advertisement. Optionally, the related ads and friends data 312 may contain the information on friends of the user that are in some way connected to or associated with a product having the same or similar feature(s). The related ads and friends data are displayed on the video player 304.

Figure 4:
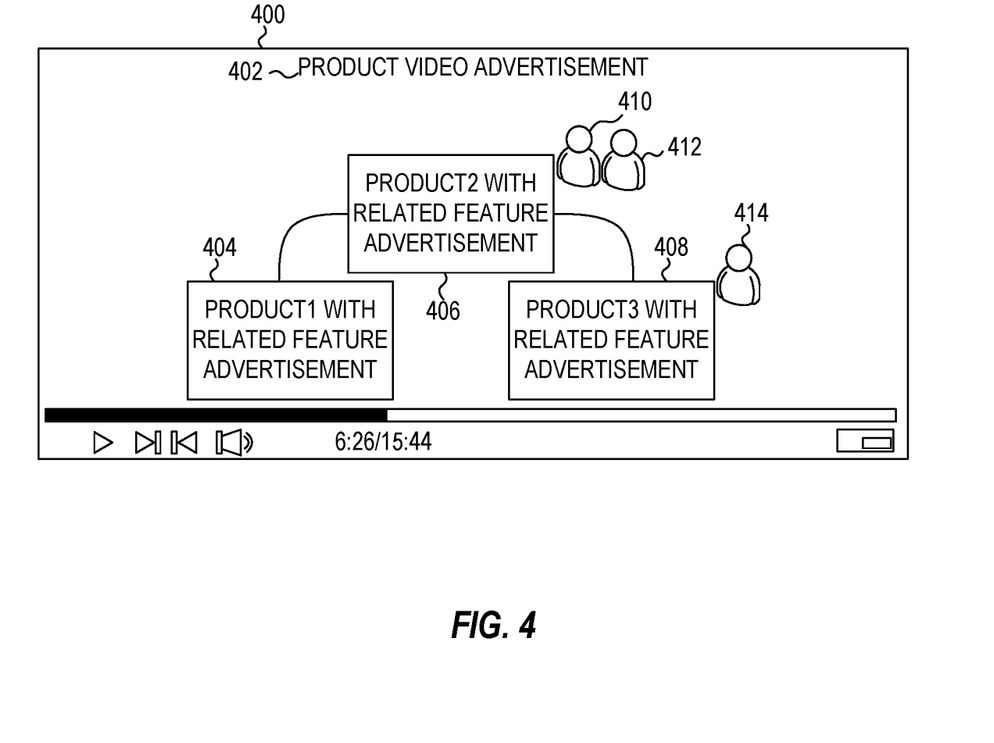
FIG. 4 is a diagram illustrating a video player in accordance with an embodiment of the present disclosure.

FIG. 4 is a diagram illustrating a video player 400 in accordance with an embodiment of the present disclosure. A user using the video player 400 plays a product video advertisement 402. The product video advertisement 402 may be an advertisement, product review, or any other type of video about a product. The user interface of the video player 400 includes control buttons such as play/pause, rewind, forward, and volume adjustment. The video player 400 can also display a progress bar and/or a time indicator indicating the current playing position/time of the product video advertisement 402.

FIG. 4 illustrates the video player 400 after a triggering event has occurred (e.g., user has paused, rewind, or forwarded the product video advertisement 402 to a particular section). As discussed above, a feature metadata video monitoring module 302 may be implemented on a streaming server or locally on the user device to monitor for the occurrence of the triggering event. In some embodiments, a threshold value may be set to indicate when the triggering event occurs. For example, a threshold value may be set to 2 for a pause action within the same section, and 1 for a rewind or forward action. Thus, in this example, a triggering event occurs when the user has either paused the playing of the product video advertisement 402 in the same section twice, or when the user has rewound or forwarded to a particular section of the product video advertisement 402.

In an embodiment, after the triggering event occurs, based on the feature metadata information corresponding to the section associated with the triggering event, the video player 400 displays one or more product advertisements for products with the same or related feature(s) corresponding to the feature(s) described at that section/portion of the product video advertisement 402. For example, in an embodiment, the video player 400 may display product1 with related feature advertisement 404, product2 with related feature advertisement 406, and product3 with related feature advertisement 408 in a semi-circle arc (as depicted), as a list of advertisements along a side, top, or bottom of the video player 400, or by other display options. As stated above, the products selected for display may be based on a ranking (e.g., based on consumer feedback), price, or other customizable preferences. In an embodiment, the user can initiate playing of one of the product advertisements with related features by simply clicking on a selected advertisement. In an embodiment, the user can close the display of the products with related features by simply continuing to play the original product video advertisement 402 (i.e., by pressing the play button on the video player 400). In some embodiments, a user can opt-out of this feature if he/she does not desire to view products with the same or related feature(s).

Additionally, in some embodiments, for users that have granted access permissions to a contacts list or social media friends list, an indicator of one or more friends associated with the product (e.g., have purchased the product, left a comment regarding the product, or indicated an interest in the product) may be displayed next to the product advertisement. For example, an image/picture (e.g., profile picture) of friend 410 and friend 412 is depicted next to the product2 with related feature advertisement 406. Similarly, an image/picture of friend 414 is depicted next to the product3 with related feature advertisement 408 to indicate that the friend 414 is associated with the product3. In some embodiments, a generic image or no image is displayed next to a name of a friend. In some embodiments, when a friend has left a review for the related product, the user can select (e.g., click on or hover over with mouse pointer) an image or name of the friend to view the comment that was left for the product. In other embodiments, the user can select an image or name of the friend to direct message the friend to inquire more information about the related product.

Figure 5:
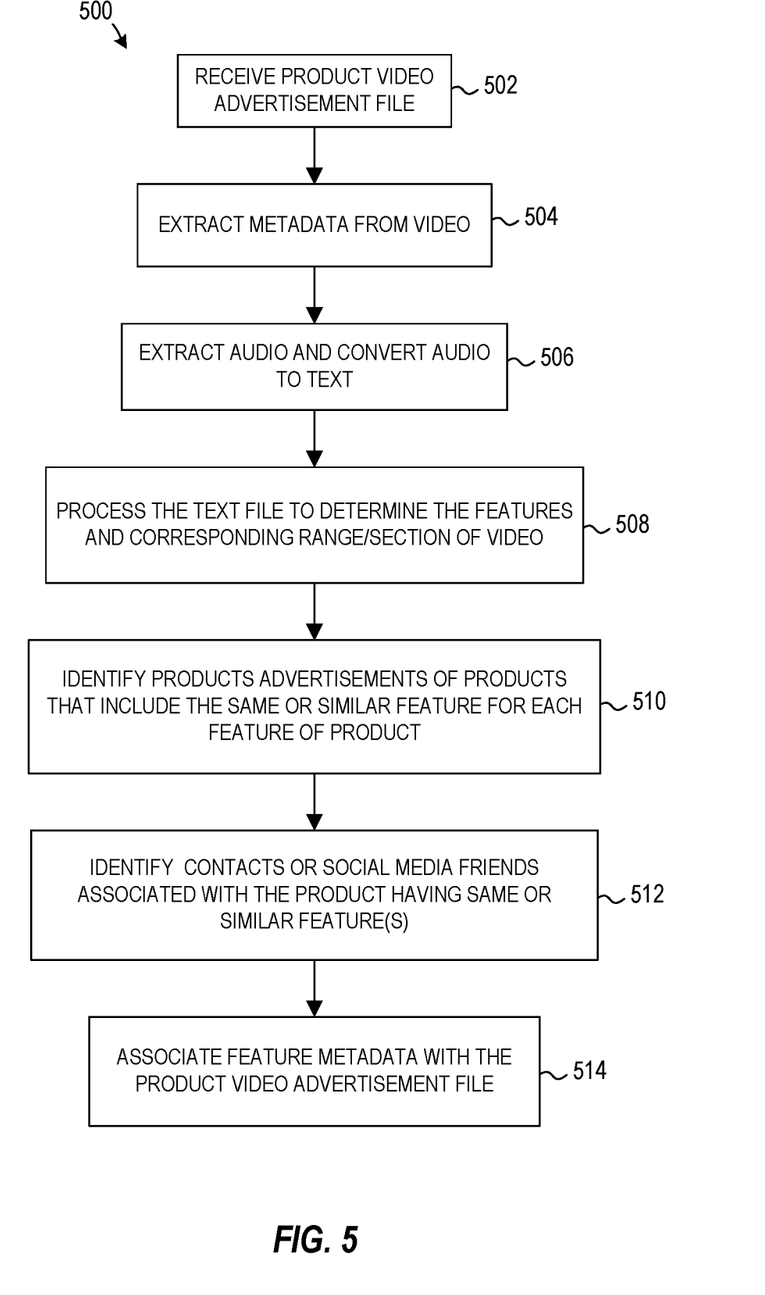
FIG. 5 is a flowchart diagram illustrating a process for creating a video advertisement with feature metadata in accordance with an embodiment of the present disclosure.

FIG. 5 is a flowchart diagram illustrating a process 500 for creating a video advertisement with feature metadata in accordance with an embodiment of the present disclosure. The process 500 may be implemented by a system such as, but not limited to, the server 104 in FIG. 1. Alternatively, the process 500 can be performed by another computing device and then uploaded to a server such as the server 104.

The process 500 begins by receiving a product video advertisement file at step 502. The process 500 extracts, at step 504, metadata such as, but not limited to, the length, title, product information, and other descriptive information from the product video advertisement file. At step 506, the process extracts audio from the product video advertisement file and converts the audio into a text file. The process 500, at step 508, process the text file to determine the features and corresponding range/section of the product video advertisement that the feature of a product is discussed. At step 510, the process 500 identifies products advertisements of products that include the same or similar feature for each of the feature of the product identified in the product video advertisement file. The process 500, at step 512, identifies friends that have some association with the products having the same or similar feature(s). At step 514, the process 500 associates feature metadata with the product video advertisement. The feature metadata indicates the features and corresponding ranges within the video. The feature metadata also includes information on product video advertisements of products having the same or similar feature (i.e., related products) as the product in the product video advertisement received at step 502.

Figure 6:
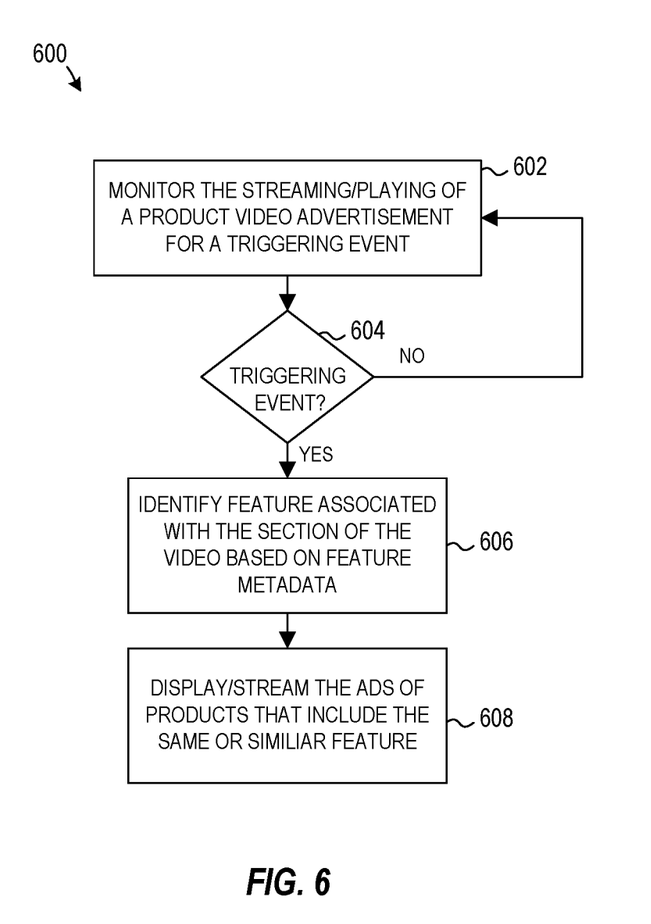
FIG. 6 is a flowchart diagram illustrating a process for displaying product advertisements in accordance with an embodiment of the present disclosure.

FIG. 6 is a flowchart diagram illustrating a process 600 for displaying product advertisements in accordance with an embodiment of the present disclosure. The process 600 may be implemented by a system such as, but not limited to, the server 104 and the client 110 in FIG. 1 (e.g., a browser or video player may include an add-on that monitors for a triggering event and display the related product video advertisements). The process 600 begins, at step 602, by monitoring the streaming/playing of a product video advertisement for a triggering event. As disclosed above, the triggering event may be one of a number of actions associated with the playing of the product video advertisements. In some embodiments, the triggering event may be user customizable. For example, the user can set whether the triggering event is activated, and what actions causes a triggering event to occur.

At step 604, the process 600 determines whether a triggering event has occurred. When a triggering event has not occurred, the process 600 returns to step 602, and continues to monitor for a triggering event. When the process 600 determines that a triggering event has occurred, the process, at step 606, identifies the feature associated with the section of the product video advertisement corresponding to the triggering event using the feature metadata associated with the product video advertisement. At step 608, the process 600 displays or streams the product video advertisements for products having the same or related feature(s) based on the feature metadata associated with the current product video advertisement. As an optional step, the process 600 may display any friend that is associated with a product having the same or related feature.

Figure 7:
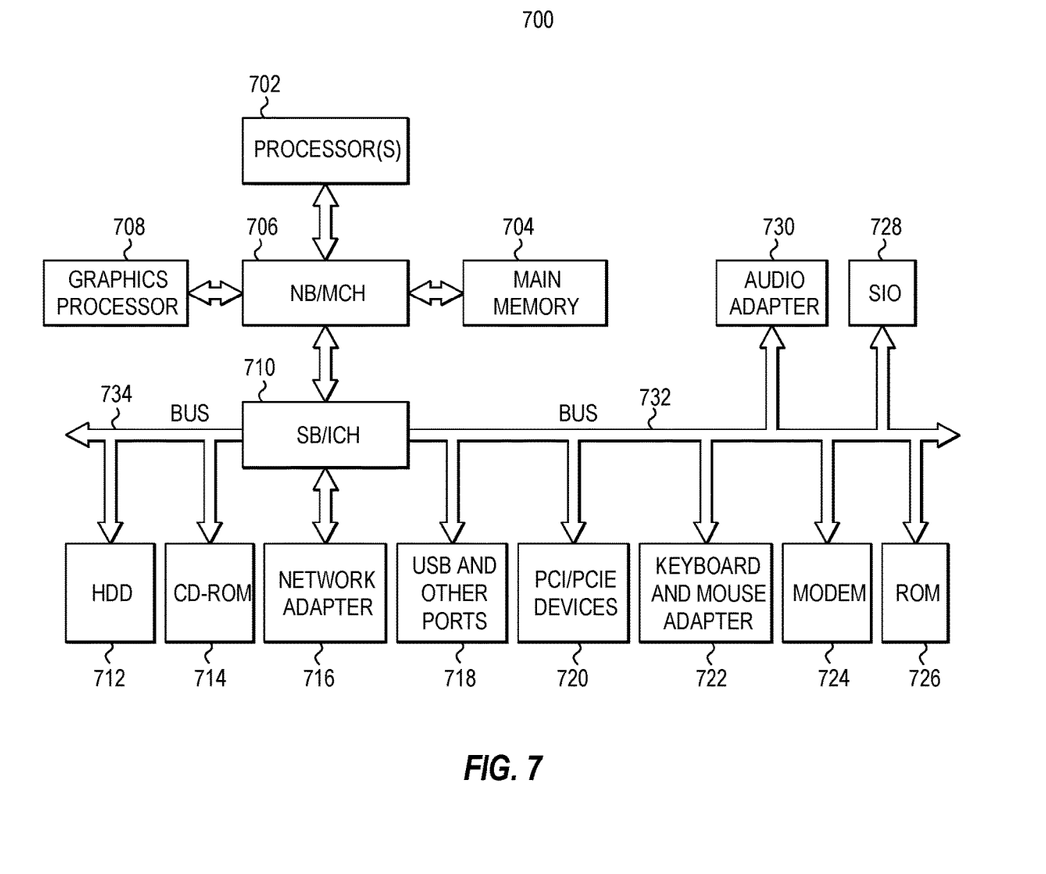
FIG. 7 is a block diagram illustrating a hardware architecture of a system according to an embodiment of the present disclosure.

FIG. 7 is a block diagram illustrating a hardware architecture of a system 700 according to an embodiment of the present disclosure in which aspects of the illustrative embodiments may be implemented. For example, in an embodiment, the server 104 and/or the client 110 may be implemented using the data processing system 700. In the depicted example, the data processing system 700 employs a hub architecture including north bridge and memory controller hub (NB/MCH) 706 and south bridge and input/output (I/O) controller hub (SB/ICH) 710. Processor(s) 702, main memory 704, and graphics processor 708 are connected to NB/MCH 706. Graphics processor 708 may be connected to NB/MCH 706 through an accelerated graphics port (AGP). A computer bus, such as bus 732 or bus 734, may be implemented using any type of communication fabric or architecture that provides for a transfer of data between different components or devices attached to the fabric or architecture.

In the depicted example, network adapter 716 connects to SB/ICH 710. Audio adapter 730, keyboard and mouse adapter 722, modem 724, read-only memory (ROM) 726, hard disk drive (HDD) 712, compact disk read-only memory (CD-ROM) drive 714, universal serial bus (USB) ports and other communication ports 718, and peripheral component interconnect/peripheral component interconnect express (PCI/PCIe) devices 720 connect to SB/ICH 710 through bus 732 and bus 734. PCI/PCIe devices may include, for example, Ethernet adapters, add-in cards, and personal computing (PC) cards for notebook computers. PCI uses a card bus controller, while PCIe does not. ROM 726 may be, for example, a flash basic input/output system (BIOS). Modem 724 or network adapter 716 may be used to transmit and receive data over a network such as the communication network 102 in FIG. 1.

HDD 712 and CD-ROM drive 714 connect to SB/ICH 710 through bus 734. HDD 712 and CD-ROM drive 714 may use, for example, an integrated drive electronics (IDE) or serial advanced technology attachment (SATA) interface. In some embodiments, HDD 712 may be replaced by other forms of data storage devices including, but not limited to, solid-state drives (SSDs). A super I/O (SIO) device 728 may be connected to SB/ICH 710. SIO device 728 may be a chip on the motherboard configured to assist in performing less demanding controller functions for the SB/ICH 710 such as controlling a printer port, controlling a fan, and/or controlling the small light emitting diodes (LEDS) of the data processing system 700.

The data processing system 700 may include a single processor 702 or may include a plurality of processors 702. Additionally, processor(s) 702 may have multiple cores. For example, in one embodiment, data processing system 700 may employ a large number of processors 702 that include hundreds or thousands of processor cores. In some embodiments, the processors 702 may be configured to perform a set of coordinated computations in parallel.

An operating system is executed on the data processing system 700 using the processor(s) 702. The operating system coordinates and provides control of various components within the data processing system 700 in FIG. 7. Various applications and services may run in conjunction with the operating system. Instructions for the operating system, applications, and other data are located on storage devices, such as one or more HDD 712, and may be loaded into main memory 704 for execution by processor(s) 702. In some embodiments, additional instructions or data may be stored on one or more external devices. The processes described herein for the illustrative embodiments may be performed by processor(s) 702 using computer usable program code, which may be located in a memory such as, for example, main memory 704, ROM 726, or in one or more peripheral devices.

The disclosed embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the disclosed embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for displaying advertisements, the method comprising:
    associating feature metadata with a product video advertisement of a product;
    detecting a triggering event during playing of the product video advertisement;
    identifying a feature of the product corresponding with a section of the product video advertisement when the triggering event occurred based on the feature metadata, wherein identifying the feature comprises:
        extracting an audio portion of the product video advertisement to generate an audio advertisement file,
        converting the audio advertisement file into a text file; and
        parsing text in the text file to determine the feature of the product being advertised;
    responsive to a type of product being undetermined, searching for featured terms within a predetermined dataset and inferring the product being advertised based on a frequency and a particular set of feature keywords found;
    determining a second product from a plurality of products that includes the feature of the product based on a ranking of the feature of the product among products in the plurality of products; and
    displaying a second product video advertisement of the second product.

2. The computer-implemented method of claim 1, wherein the triggering event is pausing the playing of the product video advertisement at the section of the product video advertisement.

3. The computer-implemented method of claim 1, wherein the triggering event is rewinding the product video advertisement to the section of the product video advertisement.

4. The computer-implemented method of claim 1, wherein the triggering event is forwarding the product video advertisement to the section of the product video advertisement.

5. The computer-implemented method of claim 1, further comprising displaying a third product video advertisement of a third product that includes the feature of the product and a fourth product video advertisement of a fourth product that includes the feature of the product, and wherein the second product video advertisement, third product video advertisement, and the fourth product video advertisement are displayed in a semi-circle arc.

6. The computer-implemented method of claim 1, wherein associating feature metadata with the product video advertisement of the product comprises:
    identifying a plurality of features of the product described in the product video advertisement; and
    identifying a range for one or more sections of the product video advertisement that describes each feature in the plurality of features.

7. The computer-implemented method of claim 1, further comprising:
    determining that a friend of a user is associated with the second product that includes the feature of the product; and
    displaying an indicator of the friend next to the second product video advertisement.

8. The computer-implemented method of claim 7, further comprising:
    receiving a selection of the indicator of the friend; and
    displaying a review of the second product posted by the friend when the friend has posted a review of the second product.

9. The computer-implemented method of claim 8, further comprising:
    receiving a selection of the indicator of the friend; and
    displaying a direct messaging window to contact the friend regarding the second product.

10. A system configured to display advertisements, the system comprising memory for storing instructions, and a processor configured to execute the instructions to:
    associate feature metadata with a product video advertisement of a product;
    detect a triggering event during playing of the product video advertisement;
    identify a feature of the product corresponding with a section of the product video advertisement when the triggering event occurred based on the feature metadata, wherein identifying the feature comprises:
        extract an audio portion of the product video advertisement to generate an audio advertisement file,
        convert the audio advertisement file into a text file; and
        parsing text in the text file to determine the feature of the product being advertised;
    responsive to a type of product being undetermined, search for featured terms within a predetermined dataset and infer the product being advertised based on a frequency and a particular set of feature keywords found;

determine a second product from a plurality of products that includes the feature of the product based on a ranking of the feature of the product among products in the plurality of products; and display a second product video advertisement of the second product.

11. The system of claim 10, wherein the triggering event is at least one pausing the playing of the product video advertisement at the section of the product video advertisement, rewinding the product video advertisement to the section of the product video advertisement, and forwarding the product video advertisement to the section of the product video advertisement.

12. The system of claim 10, wherein the instructions to associate feature metadata with the product video advertisement of the product comprises instructions to:

identify a plurality of features of the product described in the product video advertisement; and identify a range for one or more sections of the product video advertisement that describes each feature in the plurality of features.

13. The system of claim 10, wherein the processor is configured to execute the instructions to:

determine that a friend of a user is associated with the second product that includes the feature of the product; and display an indicator of the friend next to the second product video advertisement.

14. The system of claim 10, further comprising displaying a third product video advertisement of a third product that includes the feature of the product and a fourth product video advertisement of a fourth product that includes the feature of the product.

15. The system of claim 14, further comprising selecting the second product, the third product, and the fourth product a plurality of products that include feature of the product based on a ranking of the feature among the plurality of products.

16. A computer program product for displaying advertisements, the computer program product comprising a computer readable storage medium having program instructions embodied therewith, the program instructions executable by a processor of a system to cause the system to:

associate feature metadata with a product video advertisement of a product;

detect a triggering event during playing of the product video advertisement;

identify a feature of the product corresponding with a section of the product video advertisement when the triggering event occurred based on the feature metadata, wherein identifying the feature comprises:

extract an audio portion of the product video advertisement to generate an audio advertisement file, convert the audio advertisement file into a text file; and parsing text in the text file to determine the feature of the product being advertised;

responsive to a type of product being undetermined, search for featured terms within a predetermined dataset and infer the product being advertised based on a frequency and a particular set of feature keywords found;

determine a second product from a plurality of products that includes the feature of the product based on a ranking of the feature of the product among products in the plurality of products; and display a second product video advertisement of the second product.

17. The computer program product of claim 16, wherein the triggering event is at least one pausing the playing of the product video advertisement at the section of the product video advertisement, rewinding the product video advertisement to the section of the product video advertisement, and forwarding the product video advertisement to the section of the product video advertisement.

18. The computer program product of claim 16, wherein the program instructions to associate feature metadata with the product video advertisement of the product comprises instructions to:

identify a plurality of features of the product described in the product video advertisement; and identify a range for one or more sections of the product video advertisement that describes each feature in the plurality of features.

19. The computer program product of claim 16, wherein the program instructions executable by the processor of the system to further causes the system to:

determine that a friend of a user is associated with the second product that includes the feature of the product; and display an indicator of the friend next to the second product video advertisement.

20. The computer program product of claim 19, wherein the program instructions executable by the processor of the system to further causes the system to:

display a third product video advertisement of a third product that includes the feature of the product; and display a fourth product video advertisement of a fourth product that includes the feature of the product.

* * * * *